US011764201B2

(12) United States Patent
Yu et al.

(10) Patent No.: US 11,764,201 B2
(45) Date of Patent: Sep. 19, 2023

(54) INTEGRATED CIRCUIT INCLUDING STANDARD CELLS

(71) Applicant: Samsung Electronics Co., Ltd., Suwon-si (KR)

(72) Inventors: Ji Su Yu, Seoul (KR); Jae-Woo Seo, Seoul (KR); Sanghoon Baek, Seoul (KR); Hyeon Gyu You, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 17/158,109

(22) Filed: Jan. 26, 2021

(65) Prior Publication Data

US 2021/0313310 A1 Oct. 7, 2021

(30) Foreign Application Priority Data

Apr. 2, 2020 (KR) .................. 10-2020-0040340
Jun. 29, 2020 (KR) .................. 10-2020-0079329

(51) Int. Cl.
*H01L 27/02* (2006.01)
*H01L 23/528* (2006.01)
*H01L 27/092* (2006.01)
*H01L 29/06* (2006.01)
*H01L 29/423* (2006.01)
(Continued)

(52) U.S. Cl.
CPC ........ *H01L 27/0207* (2013.01); *G06F 30/392* (2020.01); *H01L 23/5286* (2013.01); *H01L 27/092* (2013.01); *H01L 29/0673* (2013.01); *H01L 29/42392* (2013.01); *H01L 29/78618* (2013.01); *H01L 29/78696* (2013.01)

(58) Field of Classification Search
CPC ............ H01L 27/0207; H01L 23/5286; H01L 27/092; H01L 29/0673; H01L 29/42392; H01L 29/78618; H01L 29/78696; H01L 29/66439; H01L 29/775; G06F 30/392; G06F 2111/20; G06F 2115/02; G06F 2115/10; B82Y 10/00
USPC ........................................................ 257/351
See application file for complete search history.

(56) References Cited

U.S. PATENT DOCUMENTS 6,941,534 B2  9/2005 Fukasawa
7,519,934 B2  4/2009 Yamamoto
(Continued)

FOREIGN PATENT DOCUMENTS

JP        3672912 B2    7/2005

*Primary Examiner* — Tong-Ho Kim
(74) *Attorney, Agent, or Firm* — Muir Patent Law, PLLC

(57) ABSTRACT

An integrated circuit including a plurality of standard cells is provided. The integrated circuit includes a first standard cell group including at least two first standard cells, a second standard cell group adjacent to the first standard cell group in a first direction, the second standard cell group including at least one second standard cell, and a first insulating gate bordered by one side of at least one of the first standard cells and one side of the at least one second standard cell, wherein each of the first and second standard cells includes a p-type transistor (pFET) and an n-type transistor (nFET) which are integrated, wherein each of the first and second standard cells has first wiring lines of different designs, and wherein each of the first and second standard cells has the same or different placement of an active region according to the corresponding design.

20 Claims, 15 Drawing Sheets

(51) Int. Cl.
*H01L 29/786* (2006.01)
*G06F 30/392* (2020.01)

(56) References Cited

U.S. PATENT DOCUMENTS

| | | |
|---|---|---|
| 8,264,011 B2 | 9/2012 | Tsuda |
| 10,282,505 B1 | 5/2019 | Ginetti |
| 10,402,534 B2 | 9/2019 | Huang et al. |
| 10,490,542 B2 | 11/2019 | Nelson et al. |
| 2018/0294226 A1 | 10/2018 | Lee et al. |
| 2019/0148407 A1 | 5/2019 | Guo et al. |
| 2020/0004919 A1 | 1/2020 | Ou et al. |
| 2020/0058681 A1 | 2/2020 | Lai et al. |
| 2021/0104611 A1* | 4/2021 | Yu ................... H01L 27/0886 |
| 2021/0134837 A1* | 5/2021 | You ................... H01L 27/11807 |

* cited by examiner

INTEGRATED CIRCUIT INCLUDING STANDARD CELLS

CROSS-REFERENCE TO RELATED APPLICATION

This application claims priority and all the benefits accruing therefrom under 35 U.S.C. § 119 to Korean Patent Application No. 10-2020-0040340, filed on Apr. 2, 2020, and Korean Patent Application No. 10-2020-0079329, filed on Jun. 29, 2020, in the Korean Intellectual Property Office, the entire contents of both of which are herein incorporated by reference.

BACKGROUND

1. Technical Field

The present disclosure relates to an integrated circuit including a standard cell.

2. Description of the Related Art

As the electronic industry becomes more highly developed, demands for characteristics of integrated circuits included in semiconductor devices are increasing. For example, demands for high reliability, high speed and/or multifunctionality, and the like for semiconductor devices are increasing. In order to meet these required characteristics, structures in integrated circuits are becoming increasingly complex and highly integrated.

The integrated circuit can be designed based on standard cells. Specifically, the layout of the integrated circuit may be generated by disposing standard cells according to data defining the integrated circuit and routing the disposed standard cells. Such a standard cell is predesigned and stored in the cell library.

SUMMARY

Aspects of the present disclosure provide an integrated circuit in which a metal track design varies for each standard cell, but the uniformity of the standard cell layout is maintained.

One aspect of the present invention provides an integrated circuit including a plurality of standard cells includes a first standard cell group including at least two first standard cells, a second standard cell group adjacent to the first standard cell group in a first direction, the second standard cell group including at least one second standard cell and a first insulating gate bordered by one side of at least one of the first standard cells and one side of the at least one second standard cell, wherein each of the at least two first standard cells and the at least one second standard cell includes a p-type transistor (pFET) and an n-type transistor (nFET) which are integrated, wherein each of the at least two first standard cells and the at least one second standard cell has first wiring lines of different designs, and wherein each of the at least two first standard cell and the at least one second standard cell has the same or different placement of an active region according to the corresponding design.

Another aspect of the present invention provides an integrated circuit including at least one first standard cell, a second standard cell adjacent to a side surface of the at least one first standard cell in a first direction and a first wiring line disposed on the at least one first standard cell or the second standard cell, wherein each of the at least one first standard cell and the second standard cell has the first wiring line disposed according to a different metal track design, wherein each of the at least one first standard cell and the second standard cell includes, at least one first active region extending in the first direction and on which a p-type transistor is disposed, at least one second active region extending in the first direction and on which an n-type transistor is disposed, an active region separation layer extending in the first direction and disposed between the first active region and the second active region, an insulating gate and at least one gate stack extending in a second direction and intersecting the first active region, the second active region, and the active region separation layer; and at least two source/drain contacts extending in the second direction and disposed between the gate stacks adjacent to each other in the first direction, wherein the metal track design includes a plurality of metal tracks on which the first wiring line can be disposed on a standard cell basis, and wherein the first wiring line is connected to the gate stack or the source/drain contact through a via.

The other aspect of the present invention provides an integrated circuit including a first standard cell group, a second standard cell group bordering a first side of the first standard cell group and a third standard cell group bordering a second side of the first standard cell group and a first side of the second standard cell group in a first direction and a first metal wiring layer disposed on the first standard cell group to the third standard cell group, wherein each of the first standard cell group to the third standard cell group includes an active region, a source/drain contact, a gate contact, and an insulating gate, wherein the first metal wiring layer includes at least one first wiring line connected to the source/drain contact or the gate contact through a via, at least one power wiring line, and an interlayer insulating layer filled between the first wiring line and the power wiring line, and wherein each of the first standard cell group, the second standard cell group, and the third standard cell group includes at least one first wiring line not disposed on the same extension line as the first wiring line in the first direction on adjacent standard cells bordering any one side.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
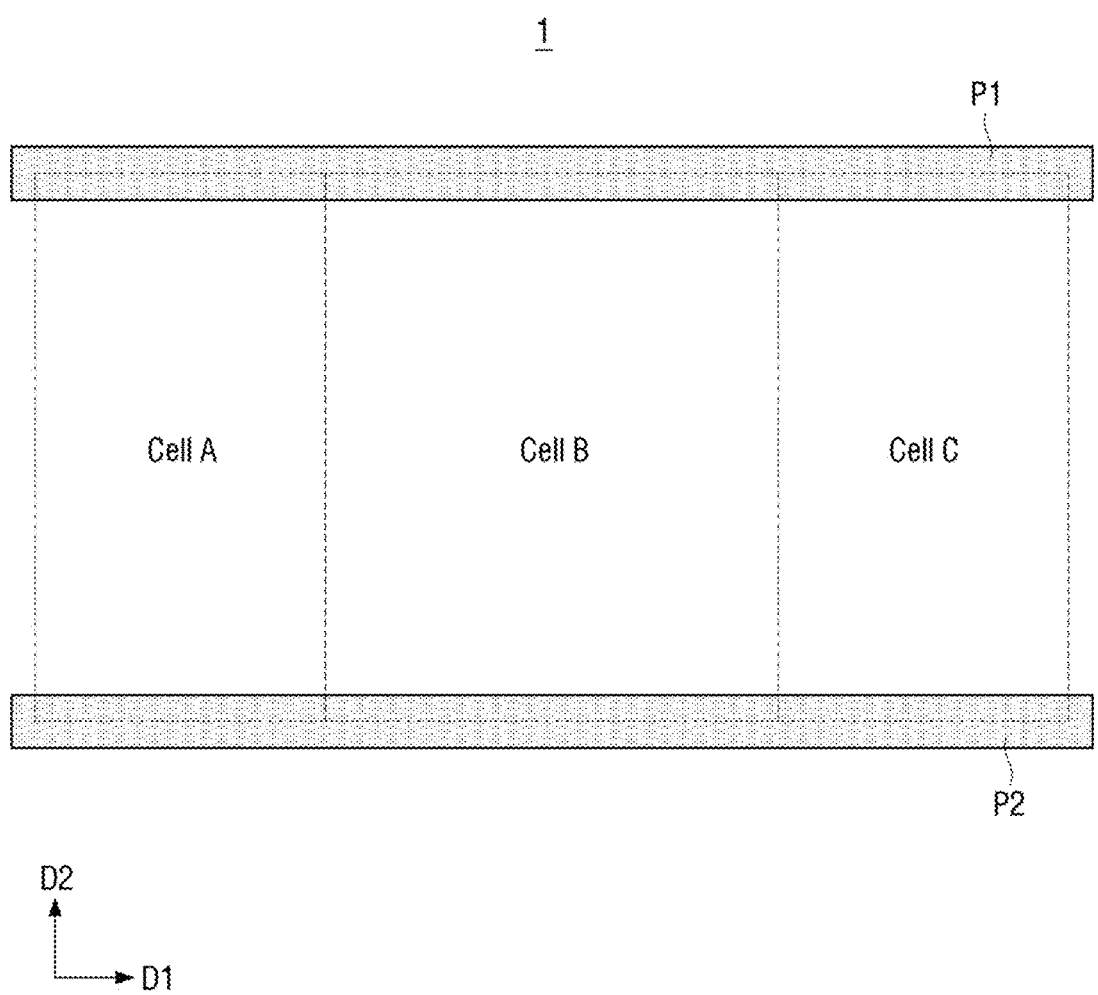
FIG. 1 is an exemplary diagram illustrating an integrated circuit, according to an example embodiment of the present disclosure.

In the following description, an integrated circuit of various example embodiments formed on a substrate (e.g., substrate 100 in FIG. 3) is provided. The substrate may be, for example, a semiconductor substrate. The integrated circuit has a layout including various standard cells. The standard cells are predesigned integrated circuit structures for repetitive use in individual integrated circuit designs. Effective integrated circuit design layouts include various predesigned standard cells and a predefined rule for disposing the standard cell to enhance circuit performance and reduce a circuit area.

An integrated circuit according to example embodiments includes one or more standard cells disposed in an integrated circuit layout according to a predefined rule. The standard cell is repeatedly used in the integrated circuit design. Accordingly, the standard cell is predesigned according to the manufacturing technology and stored in the standard cell library. An integrated circuit designer may search for such a standard cell, include the standard cell in the integrated circuit design, and dispose the standard cell in the integrated circuit layout according to a predefined placement rule.

The standard cell may include various basic circuit devices such as an inverter, AND, NAND, OR, NOR, AOI (AND OR Inverter), and OAI (OR AND Inverter) that are often used in digital circuit design for an electronic device such as, for example, central processing units (CPU), graphic processing units (GPU), and system on chip (SOC) designs. The standard cell may also include other circuit devices that are frequently used in a circuit block, such as a flip-flop and a latch.

A filler cell may be a designed block of an integrated circuit inserted between two standard cells adjacent to each other to follow the integrated circuit design and the integrated circuit manufacturing rule. The proper design and the alignment of the standard cells and the filler cell may enhance packing density and circuit performance.

In the drawings of the integrated circuit according to example embodiments, a fin-type transistor (FinFET) of a fin-type pattern shape including a channel region is exemplarily illustrated, but the technical spirit of the present disclosure is not limited thereto. It goes without saying that the integrated circuit according to example embodiments may include a tunneling transistor (tunneling FET), a transistor including a nanowire, a transistor including a nanosheet, or a three-dimensional (3D) transistor. In addition, the integrated circuit according to example embodiments of the present disclosure may also include a bipolar junction transistor, a lateral double diffused transistor (LDMOS), or the like. In addition, the integrated circuit according to example embodiments of the present disclosure may also include a vertical field effect transistor (FET).

Hereinafter, various embodiments of the present disclosure will be described with reference to the accompanying drawings.

FIG. 1 is an exemplary diagram illustrating an integrated circuit, according to an example embodiment of the present disclosure.

Referring to FIG. 1, an integrated circuit 1 includes a plurality of standard cells Cell A, Cell B, and Cell C. According to some embodiments, the standard cells may be disposed adjacent to each other in a first direction D1 between a power wiring line P1 and a power wiring line P2 spaced apart in a second direction D2, which is perpendicular to the first direction D1. According to some embodiments, the length of each of the standard cells Cell A, Cell B, and Cell C in the direction D2 may be the same. Herein, the length of the standard cell in the direction D2 may mean an interval between adjacent power wiring lines.

According to some embodiments, when any one standard cell is a multi-height cell including at least three power wiring lines, the spacing between at least two power wiring lines facing each other in the second direction D2 may be the same as the standard cell adjacent in the first direction D1.

According to some embodiments, the standard cell Cell A, the standard cell Cell B, and the standard cell Cell C may be at least one standard cell Cell A, at least one standard cell Cell B, and at least one standard cell Cell C, respectively. For example, there may be provided a first standard cell Cell A group in which at least two first standard cells are consecutively disposed, a second standard cell Cell B group in which at least two second standard cells are consecutively disposed, and a third standard cell Cell C group in which at least two third standard cells are consecutively disposed.

The standard cell Cell A, the standard cell Cell B, and the standard cell Cell C may have designs different from each other. Herein, the design means a layout for a plurality of preset metal tracks included in a first metal wiring layer of each standard cell.

Figure 2:
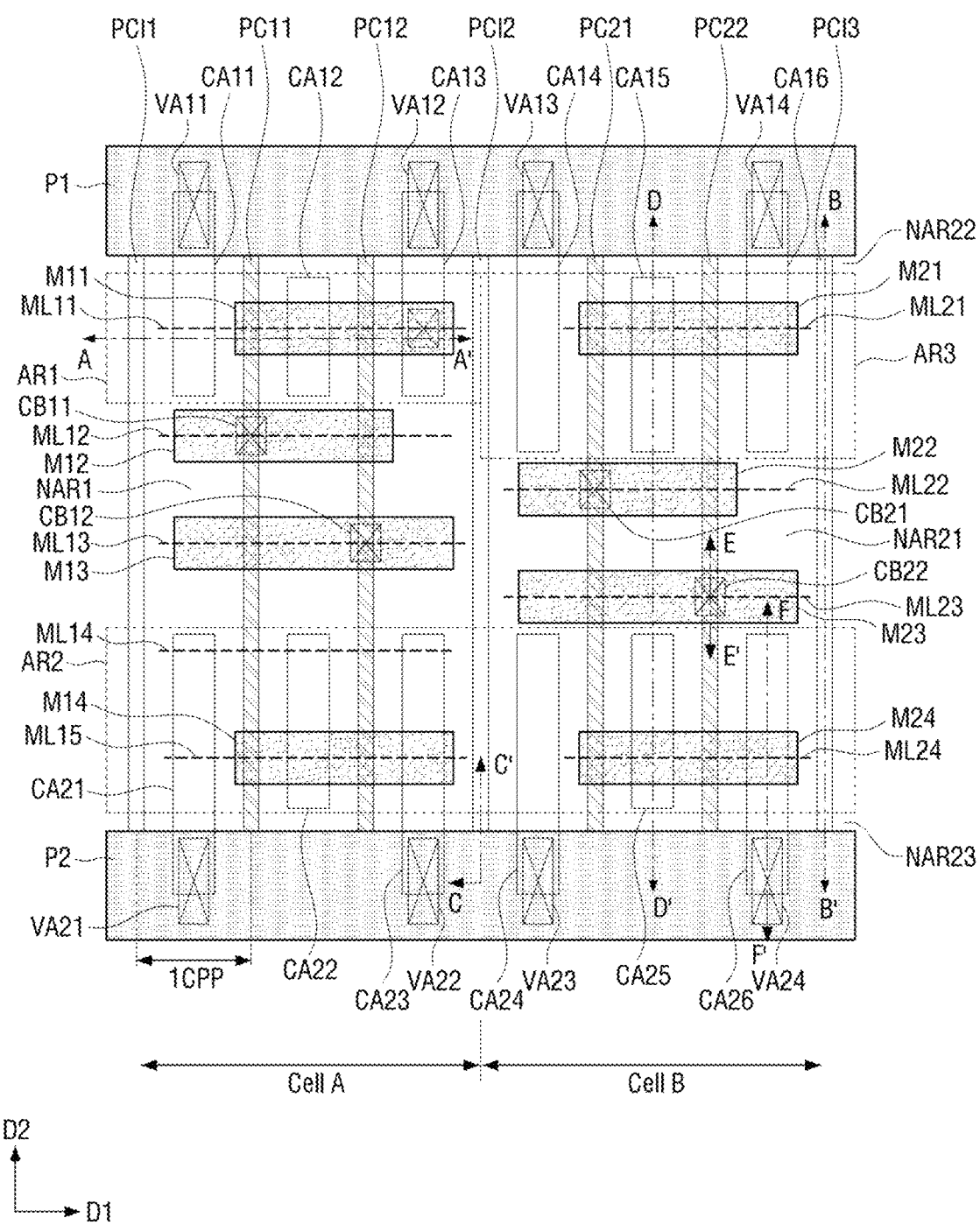
FIG. 2 is an exemplary top view illustrating the integrated circuit of FIG. 1 up to a back-end-of-line (BEOL).
Figure 3:
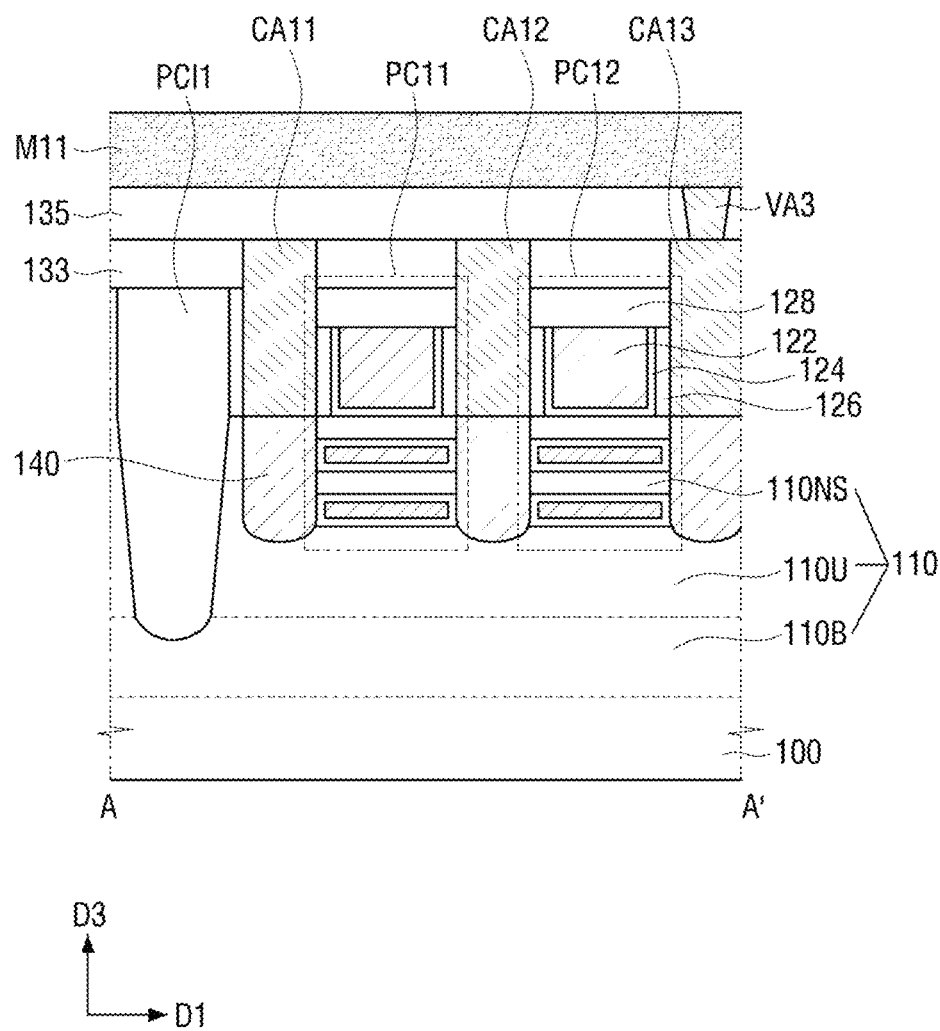
FIGS. 3 and 4 are cross-sectional views of the integrated circuit taken along line A-A' of FIG. 2.
Figure 4:
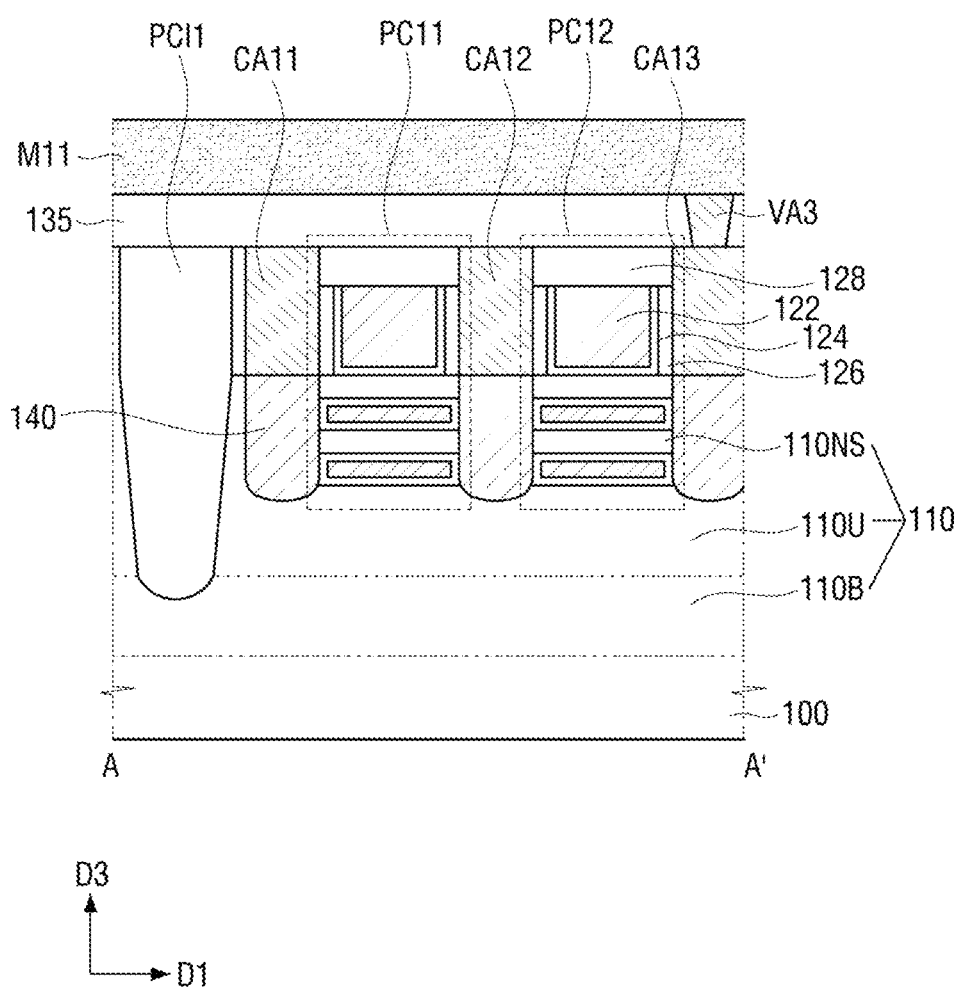
Figure 5:
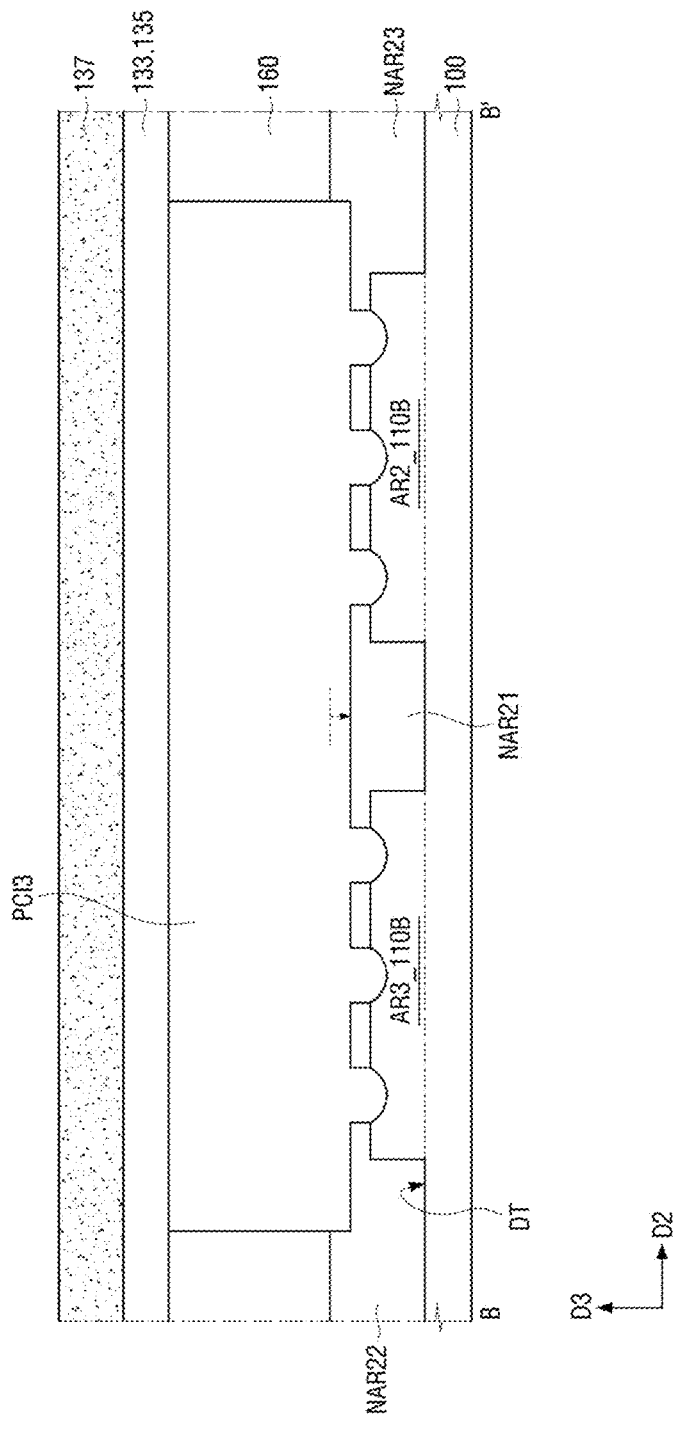
FIG. 5 is a cross-sectional view of the integrated circuit taken along line B-B' of FIG. 2.
Figure 6:
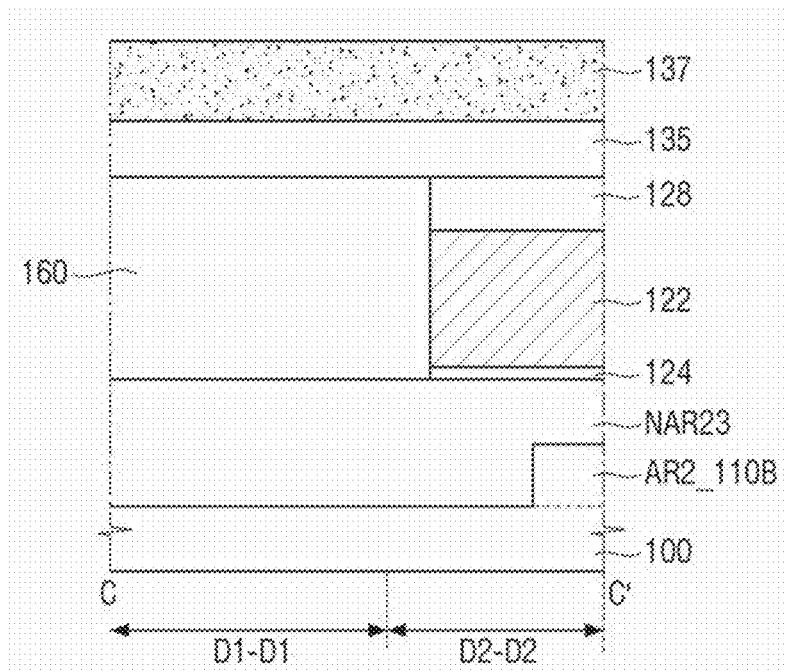
FIGS. 6 and 7 are cross-sectional views of the integrated circuit taken along line C-C' of FIG. 2.
Figure 7:
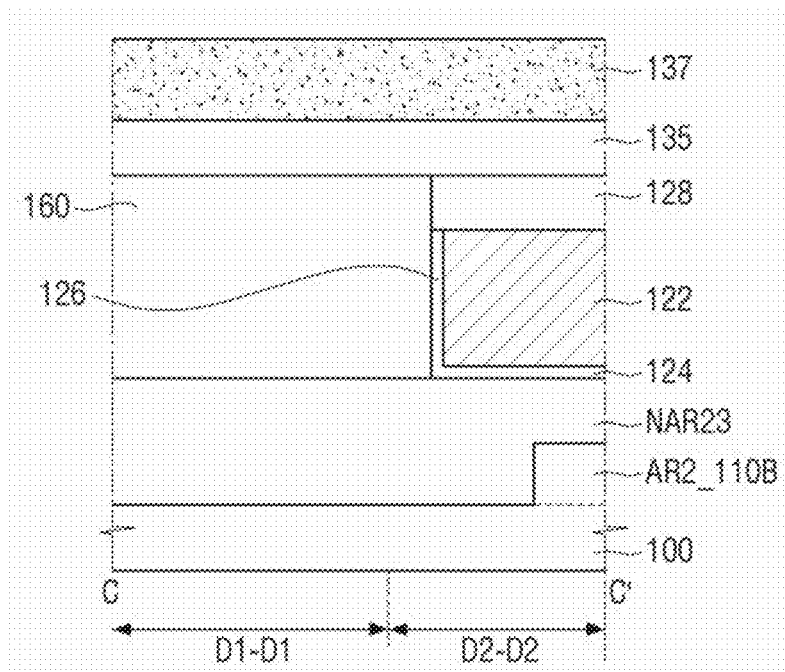
Figure 8:
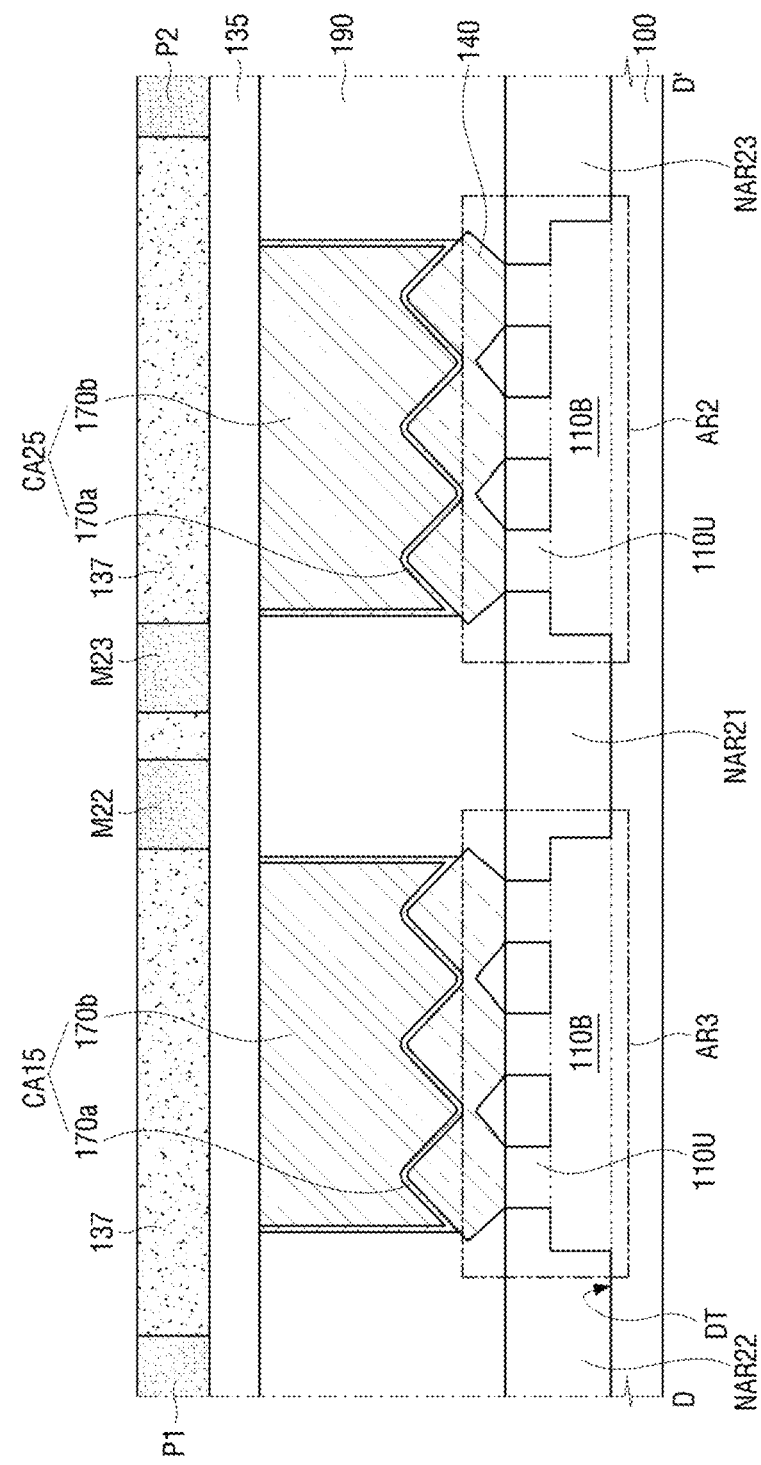
FIGS. 8 and 9 are cross-sectional views of the integrated circuit taken along line D-D' of FIG. 2.
Figure 9:
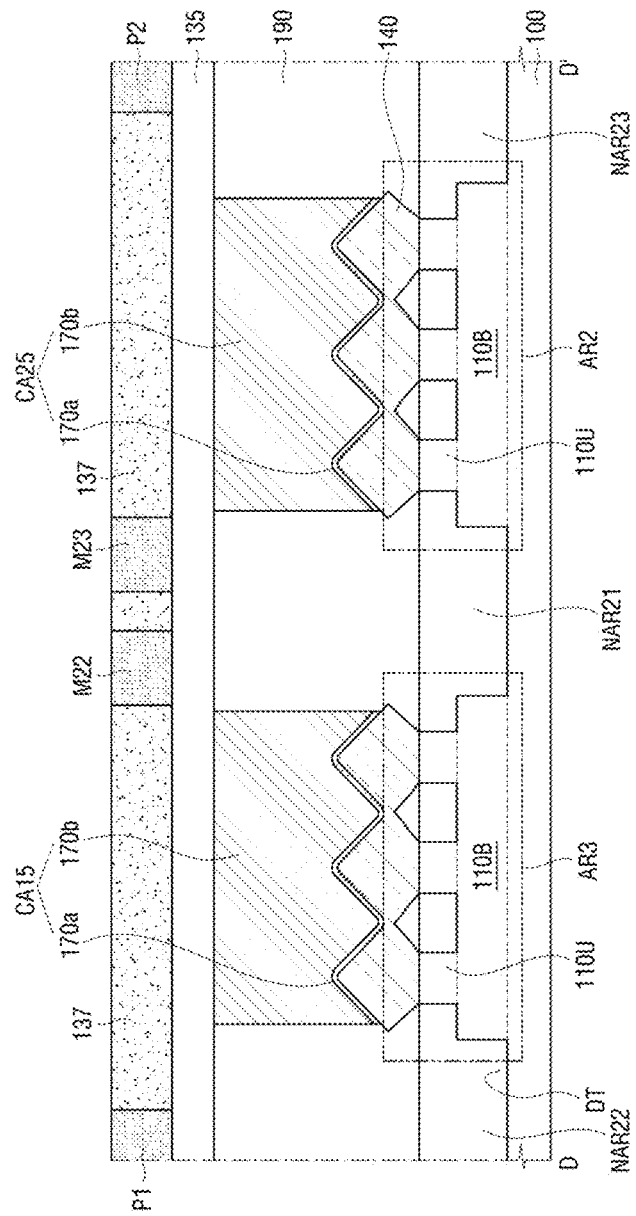
Figure 10:
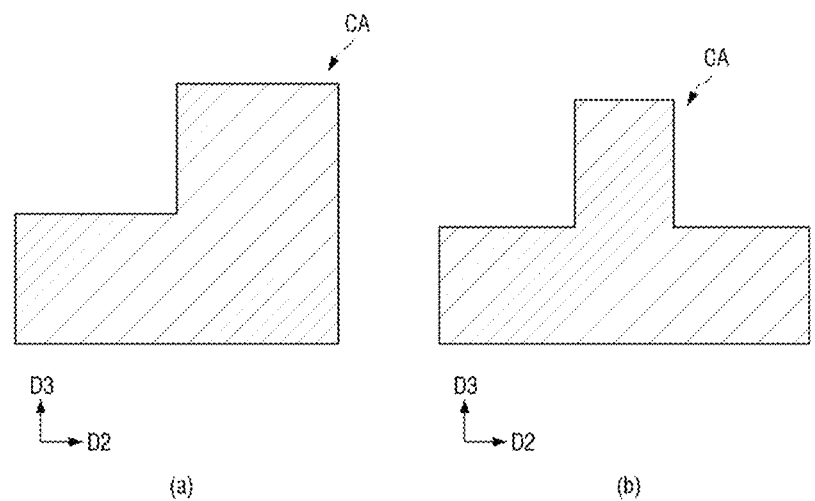
FIG. 10 includes various views that may be illustrated by cutting a source/drain contact CA of FIG. 2 in the second direction D2.

FIG. 2 is an exemplary top view illustrating the integrated circuit of FIG. 1 up to a back-end-of-line (BEOL). Hereinafter, only the BEOL, i.e., a via connected to a gate contact and a source/drain contact, and a metal wiring layer M1 on the via, are illustrated based on FIGS. 3 to 13 in addition to FIG. 2. FIGS. 3 and 4 are cross-sectional views of the integrated circuit taken along line A-A' of FIG. 2. FIG. 5 is a cross-sectional view of the integrated circuit taken along line B-B' of FIG. 2. FIGS. 6 and 7 are cross-sectional views of the integrated circuit taken along line C-C' of FIG. 2. FIGS. 8 and 9 are cross-sectional views of the integrated circuit taken along line D-D' of FIG. 2. FIG. 10 is various views that may be illustrated by cutting a source/drain contact CA of FIG. 2 in the second direction D2.

Referring to FIGS. 1 and 2, an integrated circuit according to example embodiments may include one or more standard cells Cell A, Cell B, and Cell C.

Referring to FIGS. 2 to 14, the standard cells Cell A, Cell B, and Cell C may be formed on the substrate 100. The substrate 100 may be a silicon substrate or silicon-on-insulator (SOI) substrate. Alternatively, the substrate 100 may include silicon germanium, silicon germanium on insulator (SGOI), indium antimonide, a lead tellurium compound, indium arsenide, indium phosphide, gallium arsenide, or gallium antimonide, but embodiments are not limited thereto.

First active regions AR1 and AR3 may be defined along the first direction D1. For example, the first active regions AR1 and AR3 may be adjacent to one another in the first direction D1. The first active regions AR1 and AR3 may be defined by a deep trench DT. The first active regions AR1 and AR3 may be regions in which a p-type transistor is formed. The first active regions AR1 and AR3 may include, for example, well regions doped with n-type impurities.

The first active regions AR1 and AR3 may include a first lower active region 110B, a first upper active region 110U, and a first nanosheet 110NS. Sidewalls of the first lower active region 110B may be defined by the deep trench DT. The first upper active region 110U may have a fin shape protruding from the first lower active region 110B. Sidewalls of the first upper active region 110U may be defined by a trench that is shallower than the deep trench DT. The first nanosheet 110NS may be disposed to be spaced apart from the first upper active region 110U. Although it is illustrated that there are two first nanosheets 110NS, it is for convenience of description and is not limited thereto.

The second active region AR2 may be defined along the first direction D1. For example, the second active region AR2 may extend lengthwise along the first direction D1. The second active region AR2 may be defined to be spaced apart from the first active regions AR1 and AR3 in the second direction D2. The first active regions AR1 and AR3 and the second active region AR2 may be separated by the deep trench DT. The second active region AR2 may be a region in which an n-type transistor is formed. The second active region AR2 may include, for example, a well region doped with p-type impurities.

The second active region AR2 may include a second lower active region 110B, a second upper active region 110U, and a second nanosheet 110NS. Sidewalls of the second lower active region 110B may be defined by the deep trench DT. The second upper active region 110U may have a fin shape protruding from the second lower active region 110B. Sidewalls of the second upper active region 110U may be defined by a trench that is shallower than the deep trench DT. The second nanosheet 110NS may be disposed to be spaced apart from the second upper active region 110U. Although it is illustrated that there are two second nanosheets 110NS, it is for convenience of description and is not limited thereto.

The standard cells Cell A and Cell B may each include the first active region AR1 or AR3 and the second active region AR2. Active region separation layers NAR1 and NAR21 may be formed on the substrate 100. The active region separation layers NAR1 and NAR21 may traverse between the first active regions AR1 and AR3 and the second active region AR2. For example, the active region separation layer NAR1 may be between the first active region AR1 and the second active region AR2, and the active region separation layer NAR21 may be between the first active region AR3 and the second active region AR2. The active region separation layers NAR1 and NAR21 may extend in the first direction D1. The active region separation layers NAR1 and NAR21 may fill the deep trench DT that separates the first active regions AR1 and AR3 from the second active region AR2.

Cell separation layers NAR22 and NAR23 may be formed on the substrate 100. The cell separation layers NAR22 and NAR23 may fill the deep trench DT that separates the first active regions AR1 and AR3 from the second active region AR2. The cell separation layers NAR22 and NAR23 may extend in the first direction D1 along the boundary of the standard cells Cell A and Cell B. Each of the active region separation layers NAR1 and NAR21 and the cell separation layers NAR22 and NAR23 may include an insulating material.

The active region separation layer NAR1 and NAR21 and the cell separation layers NAR22 and NAR23 may include an insulating material filling the deep trench DT defining the first active regions AR1 and AR3 and the second active region AR2. In the following description, the active region separation layers NAR1 and NAR21 may be insulating material layers disposed between the first active regions AR1 and AR3 and the second active region AR2 included in one cell. For example, the active region separation layers NAR1 and NAR21 will be described as being insulating material layers disposed inside the cell. The cell separation layers NAR22 and NAR23 are not disposed inside the cell, but may be insulating material layers extending along the cell boundary extending in the first direction D1 among the cell boundaries. For example, the cell separation layers NAR22 and NAR23 will be described as being insulating material layers disposed along the cell boundary.

Gate stacks PC11, PC12, PC21, and PC22 and insulating gates PCI1, PCI2, and PCI3 disposed adjacent to each other in the first direction D1, according to example embodiments, may be spaced apart by one contacted poly pitch (CPP). For example, the adjacent gate stacks PC11, PC12, PC21, and PC22 may be spaced apart by 1 CPP. As another example, the adjacent gate stacks PC11, PC12, PC21, and PC22 and the insulating gates PCI1, PCI2, and PCI3 may be spaced apart by 1 CPP. As yet another example, the adjacent insulating gates PCI1, PCI2, and PCI3 may be spaced apart by 1 CPP. In the present specification, the spacing between adjacent gates is referred to as CPP, but the scope of the present disclosure is not limited thereto, and may be referred to as other terms such as grid.

For example, it is assumed that there are the first gate stack PC11 and the second gate stack PC12 adjacent to each other. When the distance between the center line of the first gate stack PC11 extending in the second direction D2 and the center line of the second gate stack PC12 extending in the second direction D2 is 1 CPP, other gate stacks PC or insulating gates PCI are not disposed between the first gate stack PC11 and the second gate stack PC12.

The gate stacks PC11, PC12, PC21, and PC22 and the insulating gates PCI1, PCI2, and PCI3 may each be disposed across the first active regions AR1 and AR3 and the second active region AR2. The gate stacks PC11, PC12, PC21, and PC22 and the insulating gates PCI1, PCI2, and PCI3 may each extend from the first active regions AR1 and AR3 to the second active region AR2. The gate stacks PC11, PC12, PC21, and PC22 and the insulating gates PCI1, PCI2, and PCI3 may traverse the active region separation layers NAR1 and NAR21. Portions of the gate stacks PC11, PC12, PC21, and PC22 and portions of the insulating gates PCI1, PCI2, and PCI3 may each extend onto the cell separation layers NAR22 and NAR23.

The integrated circuit may include a plurality of gate stacks PC11, PC12, PC21, and PC22, and a plurality of insulating gates PCI1, PCI2, and PCI3. The gate stacks PC11, PC12, PC21, and PC22 and the insulating gates PCI1, PCI2, and PCI3 may each extend lengthwise along the second direction D2. The gate stacks PC11, PC12, PC21, and PC22 and the insulating gates PCI1, PCI2, and PCI3 may be spaced apart by a predetermined distance in the first direction D1 and be disposed in parallel.

Each gate stacks PC11, PC12, PC21, and PC22 may include a gate electrode 122, a gate insulating layer 124, a gate spacer 126, and a gate capping layer 128. In some cases, the gate stacks PC11, PC12, PC21, and PC22 may not include the gate capping layer 128. The gate spacer 126 may define a gate trench in which the gate insulating layer 124 and the gate electrode 122 may be formed. The gate spacer 126 may include, for example, an insulating material. The gate insulating layer 124 may be formed along the periphery of the first nanosheet 110NS. Although not illustrated, the gate insulating layer 124 may be formed along the periphery of the second nanosheet (e.g., second nanosheet 110NS in FIG. 3). The gate insulating layer 124 may include, for example, at least one of silicon oxide or a high-k material. The high-k material may be, for example, a material having a higher dielectric constant than silicon oxide. The gate electrode 122 may be formed on the gate insulating layer 124. The gate electrode 122 may wrap the first nanosheet 110NS. Although not illustrated, the gate electrode 122 may wrap the second nanosheet 110NS. The gate electrode 122 may include, for example, at least one of a metal (e.g., a metal alloy including two or more metals), a metal nitride, a metal carbide, a metal silicide, or a semiconductor material. The gate capping layer 128 may be disposed on the gate electrode 122. The gate capping layer 128 may include, for example, an insulating material.

The insulating gates PCI1, PCI2, and PCI3 may separate at least a portion of the first active regions AR1 and AR3 from at least a portion of the second active region AR2. The insulating gates PCI1, PCI2, and PCI3 may separate the first upper active region 110U of the first active regions AR1 and AR3. The insulating gates PCI1, PCI2, and PCI3 are illustrated as separating a portion of the first lower active region 110B of the first active regions AR1 and AR3, but are not limited thereto. For electrical isolation of adjacent elements, the insulating gates PCI1, PCI2, and PCI3 may entirely separate the first lower active region 110B. Although not illustrated, the insulating gates PCI1, PCI2, and PCI3 may separate the second upper active region 110U of the second active region AR2 and a portion of the second lower active region 110B. Considering the manufacturing process of forming the insulating gates PCI1, PCI2, and PCI3, after removing at least a portion of the first active regions AR1 and AR3 and at least a portion of the second active region AR2, an insulating material is filled in portions from which the first active regions AR1, AR3 and the second active region AR2 are removed. In this way, the insulating gates PCI1, PCI2, and PCI3 may be formed. Accordingly, portions of the sidewalls of the insulating gates PCI1, PCI2, and PCI3 may be in contact with the first active regions AR1 and AR3 and the second active region AR2. Portions of the sidewalls of the insulating gates PCI1, PCI2, and PCI3 may be in contact with the semiconductor material layer included in the first active regions AR1 and AR3 and the second active region AR2.

The insulating gates PCI1, PCI2, and PCI3 may traverse the active region separation layers NAR1 and NAR21. The insulating gates PCI1, PCI2, and PCI3 may be disposed on the active region separation layers NAR1 and NAR21. Portions of the insulating gates PCI1, PCI2, and PCI3 may be indented into the active region separation layers NAR1 and NAR21.

In the process of forming the insulating gates PCI1, PCI2, and PCI3, portions of the active region separation layers NAR1 and NAR21 may be removed. For this reason, the portions of the insulating gates PCI1, PCI2, and PCI3 may be indented into the active region separation layers NAR1 and NAR21. The gate spacer 126 may be disposed on the sidewalls of the insulating gates PCI1, PCI2, and PCI3. The insulating gates PCI1, PCI2, and PCI3 may include, for example, an insulating material. The insulating gates PCI1, PCI2, and PCI3 are illustrated as being a single layer, but are not limited thereto.

In the integrated circuit according to example embodiments, at least a portion of the insulating gates PCI1, PCI2, and PCI3 may be disposed at the boundary of the standard cells Cell A, Cell B, and Cell C extending in the second direction D2 and may separate adjacent standard cells from each other. The insulating gates PCI1, PCI2, and PCI3 may be disposed not only at the boundary of the standard cell, but also inside the standard cell. However, hereinafter, the insulating gates PCI1, PCI2, and PCI3 will be described as being disposed at the boundary of the standard cell extending in the second direction D2.

In FIGS. 3 to 4, a semiconductor pattern 140 may be formed between the adjacent gate stacks PC11, PC12, PC21, and PC22 and the insulating gates PCI1, PCI2, and PCI3. The semiconductor pattern 140 may be formed by removing a portion of the active regions AR1, AR3, and AR2 to form a recess, and then filling the recess through an epitaxial process.

The semiconductor pattern 140 may be formed on the first active regions AR1 and AR3. The semiconductor pattern 140 may be formed on the second active region AR2. At least a portion of the semiconductor pattern 140 may be included in the source/drain region of the transistor. The semiconductor pattern 140 formed on the first active regions AR1 and AR3 may be doped with impurities of a conductivity type different from that of the semiconductor pattern 140 formed on the second active region AR2. The semiconductor pattern 140 may also be formed between the adjacent insulating gates PCI1, PCI2, and PCI3.

Cell gate cutting patterns 160 may be disposed on the cell separation layers NAR22 and NAR23. The cell gate cutting patterns 160 may extend in the first direction D1. The cell gate cutting patterns 160 may extend in the first direction D1 along the boundary of the standard cells Cell A, Cell B, and Cell C. The gate stacks PC11, PC12, PC21, and PC22, and the insulating gates PCI1, PCI2, and PCI3 may be disposed between the cell gate cutting patterns 160 spaced apart in the second direction D2. The cell gate cutting patterns 160 may include, for example, an insulating material.

In FIGS. 4 to 6, according to some embodiments, the gate insulating layer 124 may not be formed on the sidewalls of the cell gate cutting patterns 160. In FIG. 7, according to some embodiments, the gate insulating layer 124 may extend along the sidewalls of the cell gate cutting patterns 160.

This difference may vary depending on the step at which the cell gate cutting pattern 160 is formed. When the cell gate cutting pattern 160 is formed after making the gate electrode 122, the gate insulating layer 124 may not be formed on the sidewall of the cell gate cutting pattern 160, as illustrated in FIG. 6. On the other hand, when the cell gate cutting pattern 160 is formed before making the gate electrode 122 (a mold gate step for forming the gate electrode 122), the gate insulating layer 124 may extend along the sidewall of the cell gate cutting pattern 160, as illustrated in FIG. 7.

The standard cells Cell A and Cell B may border the insulating gates PCI1, PCI2, and PCI3 with adjacent cells at the common boundary. The standard cells Cell A and Cell B illustrated in FIG. 2 are illustrated with a width of 3 CPP for convenience of description, but according to various embodiments, the cell may have a width of at least 1 CPP.

The gate stacks PC11, PC12, PC21, and PC22 of the standard cells Cell A and Cell B may intersect the first active regions AR1 and AR3 and the second active region AR2. The standard cells CELL A and CELL B may include a first p-type transistor and a first n-type transistor which are integrated. The p-type transistor may be formed at a position at which the gate stacks PC11, PC12, PC21, and PC22 and the first active regions AR1 and AR3 intersect, and the n-type transistor may be formed at a position at which the gate stacks PC11, PC12, PC21, and PC22 and the first active regions AR1 and AR3 intersect. For example, the p-type transistor may include the gate electrode 122, the first nanosheet 110NS as a channel region, and the semiconductor pattern 140 as a source/drain region.

The integrated circuit according to some embodiments may include source/drain contacts CA11, CA12, CA13, CA14, CA15, and CA16, and gate contacts CB11, CB12, CB21, and CB22.

The source/drain contacts CA11, CA12, CA13, CA14, CA15, and CA16 may be disposed on the first active regions AR1 and AR3 and the second active region AR2. The source/drain contacts CA11, CA12, CA13, CA14, CA15, and CA16 may be connected to the semiconductor pattern 140 formed on the first active regions AR1 and AR3 and the second active region AR2. The source/drain contacts CA11, CA12, CA13, CA14, CA15, and CA16 may include the normal source/drain contacts CA12 and CA15 and the extended source/drain contacts CA11, CA13, CA14, and CA16. The normal source/drain contacts CA12 and CA15 may entirely overlap the first active regions AR1 and AR3 or the second active region AR2. Portions of the extended source/drain contacts CA11, CA13, CA14, and CA16 may extend onto the cell separation layers NAR22 and NAR23 and the cell gate cutting pattern 160, overlapping the cell separation layers NAR22 and NAR23 and the cell gate cutting pattern 160 in the third direction D3, perpendicular to both the first and second directions D1 and D2. The extended source/drain contacts CA11, CA13, CA14, and CA16 may be connected to the power wiring lines P1 and P2 to be described later.

The gate contacts CB11, CB12, CB21, and CB22 are formed on the gate stacks PC11, PC12, PC21, and PC22, respectively, and are not formed on the insulating gates PCI1, PCI2, and PCI3. The gate contacts CB11, CB12, CB21, and CB22 may be connected to the gate stacks PC11, PC12, PC21, and PC22, respectively. For example, the gate contact CB11 may be electrically connected to the gate electrode 122 of the gate stack PC11, the gate contact CB12 may be electrically connected to the gate electrode 122 of the gate stack PC12, the gate contact CB21 may be electrically connected to the gate electrode 122 of the gate stack PC21, and the gate contact CB22 may be electrically connected to the gate electrode 122 of the gate stack PC22.

According to some embodiments, the gate contacts CB11, CB12, CB21, and CB22 may be disposed on the first active regions AR1 and AR3 and the second active region AR2. Further, according to some embodiments, the gate contacts CB11, CB12, CB21, and CB22 may also be formed on the active region separation layers NAR1 and NAR21. In the integrated circuit according to some embodiments, at least one of the gate contacts CB11, CB12, CB21, and CB22 may be disposed at a position overlapping one of the first active regions AR1 and AR3 and the second active region AR2.

The standard cells Cell A, Cell B, and Cell C may further include at least one normal source/drain contacts CA12 and CA15, the extended source/drain contacts CA11, CA13, CA14, and CA16, and the gate contacts CB11, CB12, CB21, and CB22.

In FIG. 8, according to some embodiments, the source/drain contacts CA11 to CA16 may include a contact barrier layer 170a and a contact filling layer 170b. The contact filling layer 170b may fill a trench defined by the contact barrier layer 170a. Further, as shown in FIG. 9, according to some embodiments, the contact barrier layer 170a may be formed only between the semiconductor pattern 140 and the contact filling layer 170b, and may not be formed between the interlayer insulating layer 190 and the contact filling layer 170b.

FIG. 10 illustrates exemplary cross sections of the source/drain contacts CA11, CA12, CA13, CA14, CA15, and CA16. FIG. 10 may be cross-sectional views of the source/drain contacts CA11, CA12, CA13, CA14, CA15, and CA16 taken along the second direction D2.

As the gate contacts CB11, CB12, CB21, CB22 are disposed on the first active regions AR1 and AR3 and the second active region AR2, a short margin between the gate contacts CB11, CB12, CB21, and CB22 and the source/drain contacts CA11, CA12, CA13, CA14, CA15, and CA16 should be considered. For example, depending on whether a gate via VB is positioned near the source/drain contacts CA11, CA12, CA13, CA14, CA15, and CA16, the cross-section of the source/drain contacts CA11, CA12, CA13, CA14, CA15, and CA16 may have an L-shape ((a) of FIG. 10) or may have a T-shape rotated 180 degrees ((b) of FIG. 10). When the gate contacts CB11, CB12, CB21, and CB22 are not disposed nearby, the source/drain contacts CA11, CA12, CA13, CA14, CA15, and CA16 may have a cross-section as illustrated in FIG. 10.

In FIG. 2 and FIGS. 11 to 13, the integrated circuit according to some embodiments may include source/drain vias VA, gate vias VB, metal tracks ML, wiring lines M, and the power wiring lines P1 and P2. As discussed further herein, the source/drain vias VA may include source/drain vias VA11 to VA14 and VA21 to VA24, the metal tracks ML may include metal tracks ML11 to ML15 and ML21 to ML24, and the wiring lines M may include wiring lines M11 to M15 and M21 to M24.

In the present disclosure, for convenience of description, it is collectively referred to as the source/drain vias VA, but the source/drain vias VA connected to the normal source/drain contacts CA12 and CA15 may be referred to as normal source/drain vias VA, and the source/drain vias VA connecting the extended source/drain contacts CA11, CA13, CA14, and CA16 to the power wiring lines may be referred to as extended source/drain vias VA. The standard cells CELL A and CELL B may include the source/drain vias VA, the gate vias VB, the metal tracks ML, the wiring lines M, and the power wiring lines P1 and P2.

The integrated circuit may include a plurality of metal wiring layers. At least one metal wiring layer may be disposed on the gate contact and the source/drain contact. One metal wiring layer may include at least one wiring line M and interlayer insulating layer 137 on the same plane. The at least one wiring line M and the interlayer insulating layer 137 may be provided on interlayer insulating layer 135. Referring to FIG. 3, in some embodiments, interlayer insulating layer 135 may be provided on interlayer insulating layer 133, which is provided on the semiconductor pattern 140 and gate capping layer 128.

The wiring lines M may be disposed on a plurality of metal wiring layers, respectively. However, the wiring lines M illustrated in FIGS. 2 to 10 represents only the wiring line disposed on a first metal wiring layer connected to the source/drain contact CA or the gate contact CB through the source/drain via VA or the gate via VB.

The standard cell Cell A and the standard cell Cell B may have the wiring lines M with designs different from each other. In this case, the design may mean a metal track layout in which a wiring line may be disposed. The metal track layout refers to a preset position in which wiring lines disposed on the first metal wiring layer may be disposed.

The standard cell Cell A and the standard cell Cell B may have the same spacing between the power wiring lines P1 and P2 adjacent to each other and have the same or different number of metal tracks between the two power wiring lines P1 and P2.

According to example embodiments, FIG. 2 illustrates that the standard cell Cell A has a first design including five metal tracks ML11, ML12, ML13, ML14, and ML15, and that the standard cell Cell B has a second design including four metal tracks ML21, ML22, ML23, and ML24.

More specifically, the metal tracks ML11 and ML15 of the standard cell Cell A may be disposed on the same line as the metal tracks ML21 and ML24 of the standard cell Cell B in the second direction D2, respectively. On the other hand, the metal tracks ML12 and ML13 of the standard cell Cell A are disposed on a different line from the metal tracks ML22 and ML23 of the standard cell Cell B in the second direction D2.

One side of each of the standard cell Cell A and the standard cell Cell B may border the insulating gate PCI2. In the above embodiment, only one standard cell Cell A and one adjacent standard cell Cell B are illustrated for convenience of description, but according to various embodiments, it may illustrate the standard cell Cell A and the standard cell Cell B at a boundary at which the standard cell Cell A group in which at least two standard cells Cell A are consecutively disposed, and the standard cell Cell B group in which at least two standard cells Cell B are consecutively disposed, are adjacent to each other. Still yet some embodiments will be described with reference to FIG. 14 hereinafter.

Figure 11:
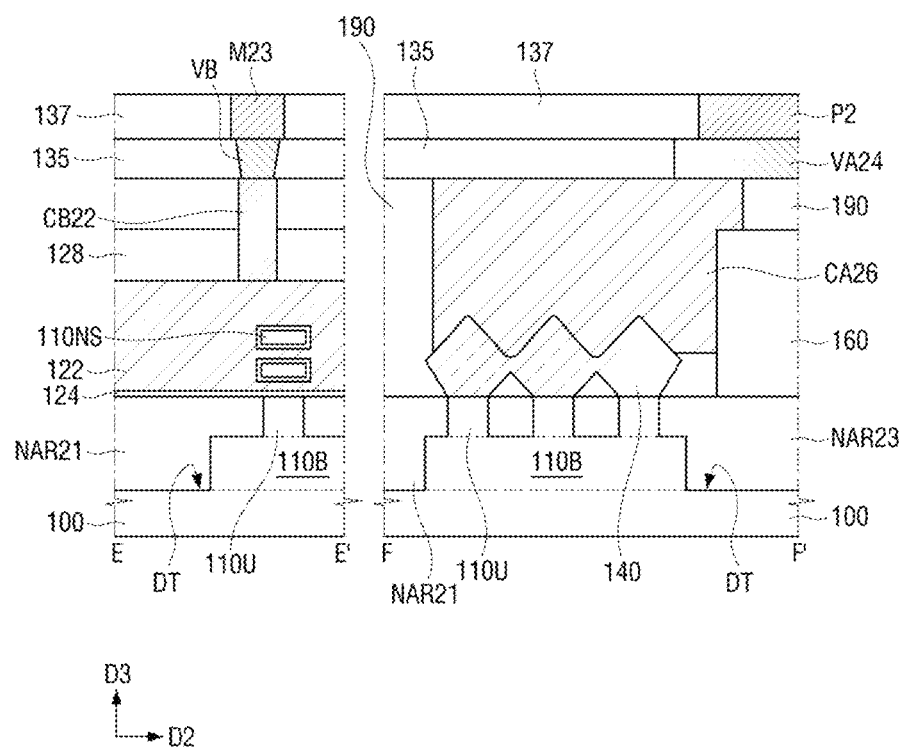
FIGS. 11 to 13 are cross-sectional views of the integrated circuit taken along lines E-E' and F-F' of FIG. 2.
Figure 12:
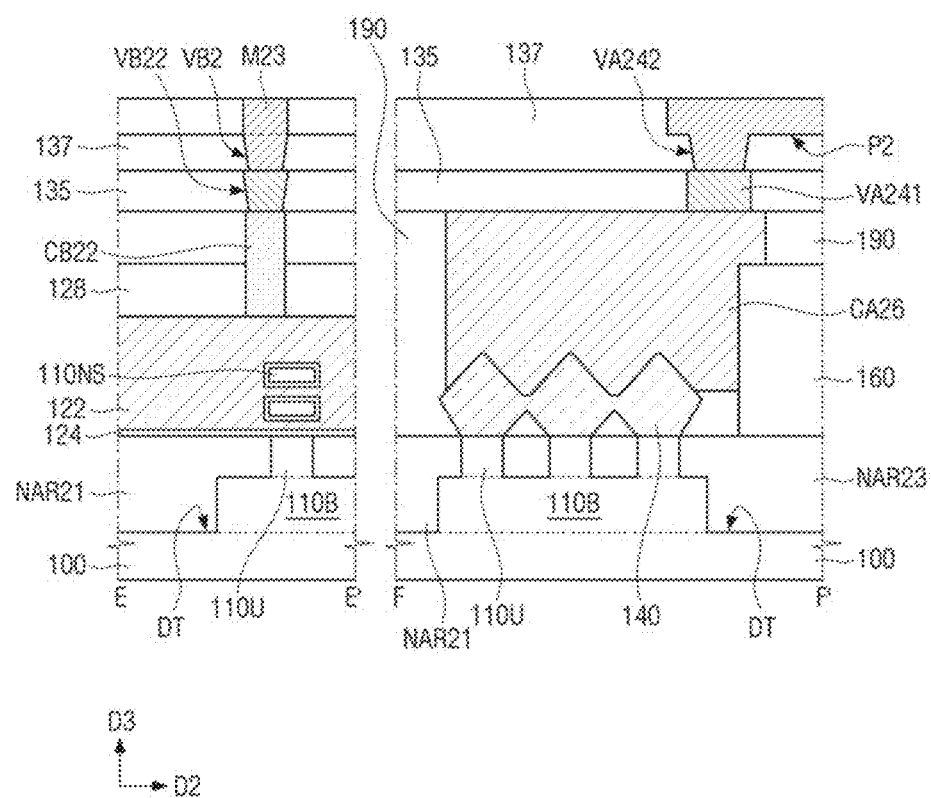
Figure 13:
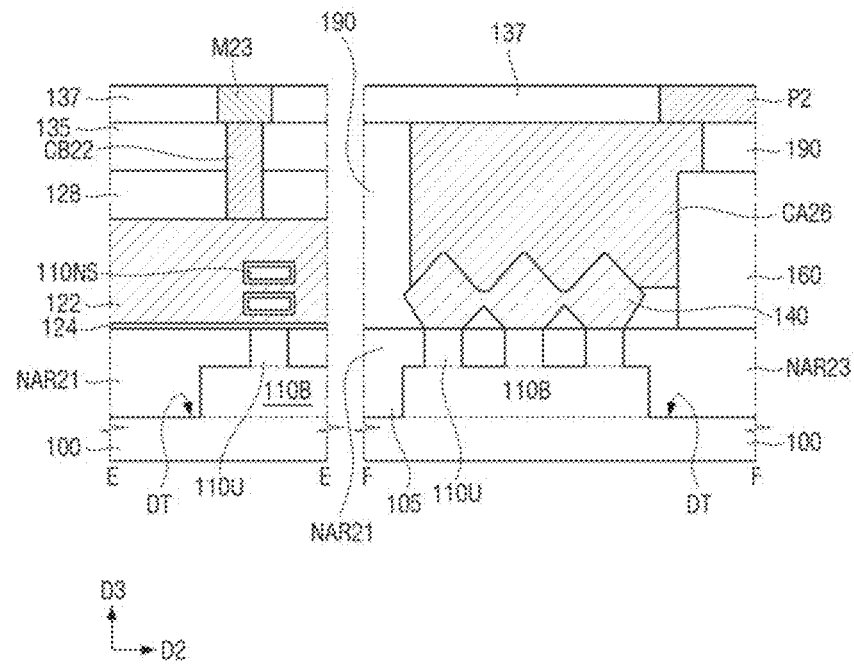

FIGS. 11 to 13 are cross-sectional views of the integrated circuit taken along lines E-E' and F-F' of FIG. 2.

In FIGS. 2, 4, and 11, the gate via VB may be formed on the gate contact CB22. A lower surface of the gate via VB may contact an upper surface of the gate contact CB22, and an upper surface of the gate via VB may contact a lower surface of the wiring line M23. The gate via VB may connect the gate contact CB22 to the wiring line M23. The source/drain via VA24 may be formed on the source/drain contact CA26. The source/drain via VA24 may be connected to at least a portion of the source/drain contact CA26. The source/drain vias VA may include a via VA3 connecting the source/drain contacts CA13 to the wiring line M11, and power wiring vias VA11 to VA14 and VA21 to VA24 respectively connecting the extended source/drain contacts CA11, CA13, CA14, CA16, CA21, CA23, CA24, and CA26 to the power wiring lines P1 and P2.

In FIG. 2, the wiring lines M11 to M15 and M21 to M24 and the power wiring lines P1 and P2 may extend lengthwise in the first direction D1. The power wiring lines P1 and P2 may include an upper power wiring line P1 to which a first voltage is supplied and a lower power wiring line P2 to which a second voltage is supplied. The upper power wiring line P1 may supply a first power to a p-type transistor, and the lower power wiring line P2 may supply a second power to an n-type transistor. According to some embodiments, the first power may be a system supply voltage, and the second power may be a system ground voltage. According to some embodiments, the first power may be a first supply voltage adjusted to a preset level, and the second power may be a system ground voltage or a first ground voltage adjusted to a preset level.

Structures connecting the gate contacts CB11, CB12, CB21, and CB22 to the wiring lines M12, M13, M22, and M23, the source/drain contacts CA11 to CA26, the wiring lines M11, M15, M21, and M24, and the power wiring lines P1 and P2 may have a structure as illustrated in FIG. 11. In some embodiments, structures connecting the gate contacts CB11, CB12, CB21, and CB22 to the wiring lines M12, M13, M22, and M23, the source/drain contacts CA11 to CA26, the wiring lines M11, M15, M21, and M24, and the power wiring lines P1 and P2 may have a structure different from that illustrated in FIG. 11.

In FIG. 12, according to another embodiment, a middle contact VA241 may be further interposed between a source/drain via VA242 and the source/drain contact CA26. A middle contact VB22 may be further interposed between the gate via VB2 and the gate contact CB22. Although the wiring line M23 and the gate via VB2 are illustrated to have an integrated structure, it is not limited thereto. The wiring line M23 and the gate via VB2 may be separated by a barrier layer.

According to still another embodiment, in FIG. 13, without the source/drain via VA24, the source/drain contact CA26 may be connected directly to the wiring lines M11, M15, M21, and M24 or the power wiring lines P1 and P2. For example, the source/drain contact CA26 may contact the wiring lines M11, M15, M21, and M24 or the power wiring lines P1 and P2. Without the gate via VB, the gate contact CB22 may be connected directly to the wiring line M23. For example, the gate contact CB22 may contact the wiring line M23.

FIGS. 14 to 17 are views of the integrated circuit of FIG. 1, according to some example embodiments. FIGS. 14 to 17 are top views of the integrated circuit up to BEOL. For convenience of explanation, the gate stacks PC, the insulating gates PCI, the power wiring lines P1 and P2, the metal tracks ML, and the wiring lines M are only illustrated. It will be said that the examples described in FIGS. 2 to 13 may be applied without modification to the remaining configurations which are not illustrated.

Figure 14:
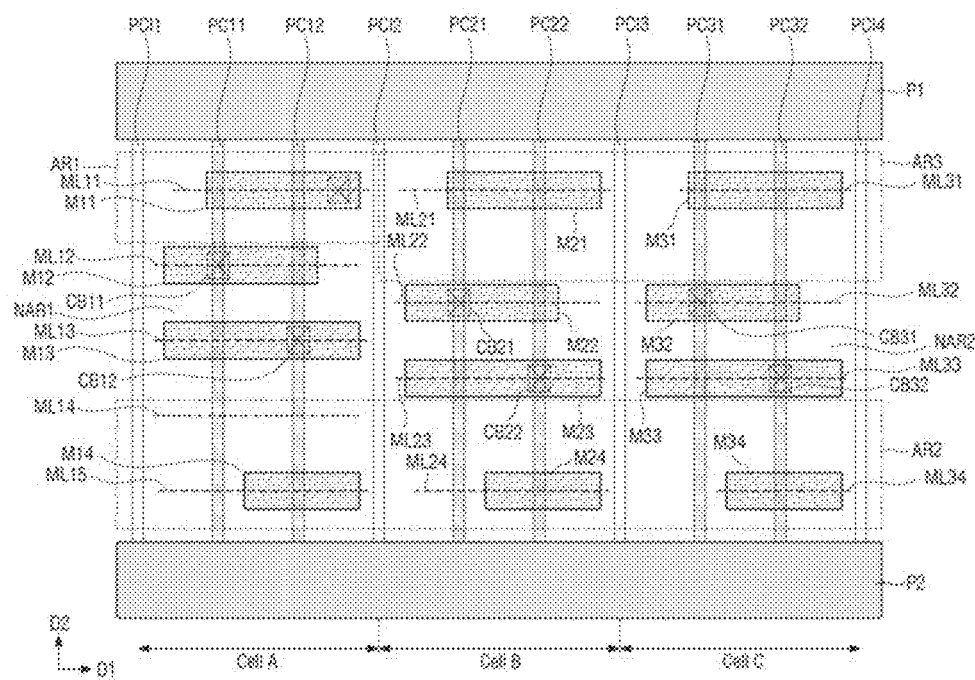
FIGS. 14 to 17 are views of the integrated circuit of FIG. 1, according to example embodiments.

Referring to FIG. 14, according to some embodiments, the integrated circuit may include the three standard cells Cell A, Cell B, and Cell C.

The insulating gates PCI1, PCI2, PCI3, and PCI4 may be the boundaries that extend lengthwise in the second direction D2 to separate a standard cell from a standard cell, and may be bordered on one side between at least two adjacent standard cells.

In the illustrated embodiment, the standard cells Cell A, Cell B, and Cell C include the power wiring line P1 and the power wiring line P2, and have the same length in the second direction D2.

At least one standard cell Cell A of the standard cells Cell A, Cell B, and Cell C may have metal tracks with designs different from each other. In the illustrated example, the standard cell Cell A may include the five metal tracks ML11, ML12, ML13, ML14, and ML15, the standard cell Cell B may include the four metal tracks ML21, ML22, ML23, and ML24, and the standard cell Cell C may include four metal tracks ML31, ML32, ML33, and ML34. In the illustrated embodiment, a case where the standard cell Cell B and the standard cell Cell C have the same metal track design is illustrated, but according to various embodiments, the standard cell Cell C may have a metal track design different from the standard cell Cell B.

In the standard cells Cell A, Cell B, and Cell C, the placement of the active regions AR1, AR2, and AR3 may vary according to the metal track design. For example, the standard cell Cell A may have a design such that, among the five metal tracks ML11 to ML15, the metal tracks ML12 and ML13 are disposed on the active region separation layer NAR1, the metal track ML11 is disposed in the active region AR1, and the metal tracks ML14 and ML15 are disposed in the active region AR2. In the standard cell Cell B, one metal track ML21 may be disposed the active region AR1, one metal track ML24 may be disposed on the active region AR2, and two metal tracks ML22 and ML23 may be disposed on the active region separation layer NAR2. In the standard cell Cell C, one metal track ML31 may be disposed on the active region AR1, one metal track ML34 may be disposed on the active region AR2, and two metal tracks ML32 and ML33 may be disposed on the active region separation layer NAR2.

For example, the length of the active region AR1 in the second direction D2 may be changed to correspond to the placement of the metal track. In the illustrated example, the active region AR1 of the standard cell Cell A may have a different length in the second direction D2 from a length of the active region AR2 including two metal tracks or from a length of the active region AR3 of the standard cells Cell B and Cell C.

In the illustrated example, the metal track ML11 is disposed on the same line extending in the first direction D1 as the metal tracks ML21 and ML31, and the metal track ML15 is disposed on the same line extending in the first direction D1 as the metal tracks ML24 and ML34, but the metal tracks ML12, ML13, and ML14 are disposed on a different line from the metal tracks ML22 and ML23 of the standard cell Cell B and on a different line from the metal tracks ML32 and ML33 of the standard cell Cell C extending in the first direction D1.

The wiring lines included in the standard cells Cell A, Cell B, and Cell C may be disposed on at least one corresponding position among at least two or more metal tracks of the design of each standard cell. In the standard cell Cell A, the wiring lines M11, M12, M13, and M14 may be disposed on the metal tracks ML11, ML12, ML13, and ML15, respectively. In the standard cell Cell B, the wiring lines M21, M22, M23, and M24 may be disposed on the metal tracks ML21, ML22, ML23, and ML24, respectively. In the standard cell Cell C, the wiring lines M31, M32, M33, and M34 may be disposed on the metal tracks ML31, ML32, ML33, and ML34, respectively.

Since the wiring line of the standard cell Cell A is disposed according to the corresponding metal track design, the standard cell may have at least one wiring line not disposed on the same line as the wiring line of other adjacent standard cells Cell B and Cell C extending in the first direction D1.

Figure 15:
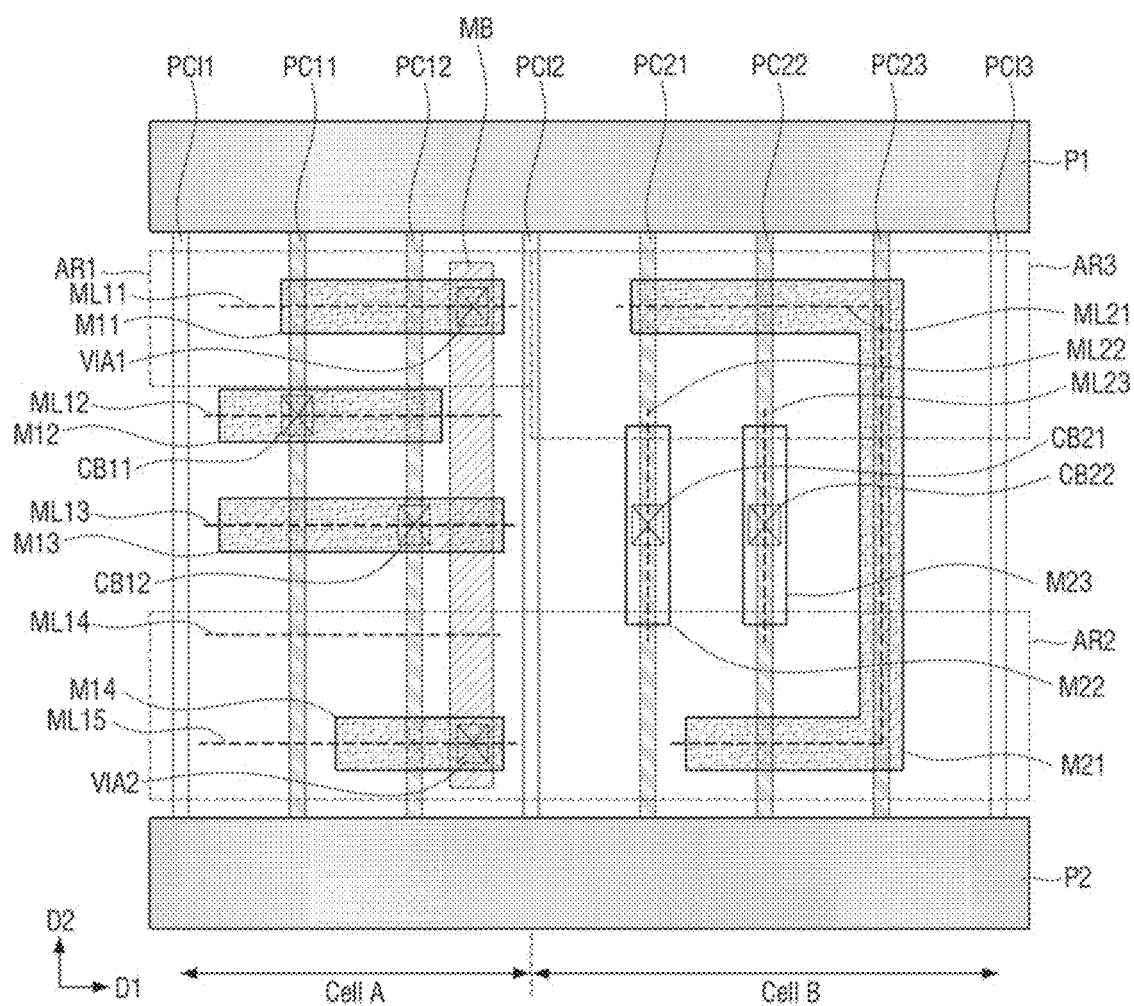

Referring to FIG. 15, according to some embodiments, the integrated circuit may include two standard cells Cell A and Cell B.

At least one insulating gate PCI2 of the insulating gates PCI1, PCI2, and PCI3 may be the boundary that extends in the second direction D2 to separate the standard cell Cell A and the standard cell Cell B, and may be bordered on one side between at least two adjacent standard cells.

In the illustrated embodiment, the standard cells Cell A and Cell B include the power wiring line P1 and the power wiring line P2, and have the same length in the second direction D2. Although the metal track design is changed in various ways, since the spacing between the power wiring lines is constant, uniformity in layout design may be improved.

At least one standard cell Cell A among the standard cells Cell A and Cell B may have metal tracks with designs different from each other. In the illustrated example, the standard cell Cell A may include five metal tracks ML11, ML12, ML13, ML14, and ML15 extending only in the first direction D1, and the standard cell Cell B may include one metal track ML21 extending in the first direction D1 and the second direction D2 and two metal tracks ML22 and ML23 extending only in the second direction D2. The metal track ML21 may include at least one segment extending in the first direction D1 and at least one segment extending in the second direction D2. For example, the metal track ML21 of the standard cell Cell B includes two linear segments that extend in the first direction D1 and one linear segment that extends in the second direction D2.

The placement of the active regions AR1, AR2, and AR3 in each standard cell may also vary according to the metal track design. In the illustrated example, since one metal track ML11 is disposed in the first active region AR1 of the standard cell Cell A, the first active region AR1 may have a different length in the second direction D2 from a length of the first active region AR3 of the adjacent standard cell Cell B. In the illustrated example, a case where the second active region AR2 of the standard cell Cell A and the second active region AR2 of the standard cell Cell B have the same length in the second direction D2, is illustrated as an example, but according to various embodiments, the second active region AR2 of the standard cell Cell A may have a different length in the second direction D2 from a length of the second active region of the standard cell Cell B.

In the illustrated example, only two standard cells are illustrated, but according to various embodiments, at least one standard cell Cell A may be consecutively disposed on the left side of the standard cell Cell A, and at least one standard cell Cell B may be consecutively disposed on the right side of the standard cell Cell B.

Figure 16:
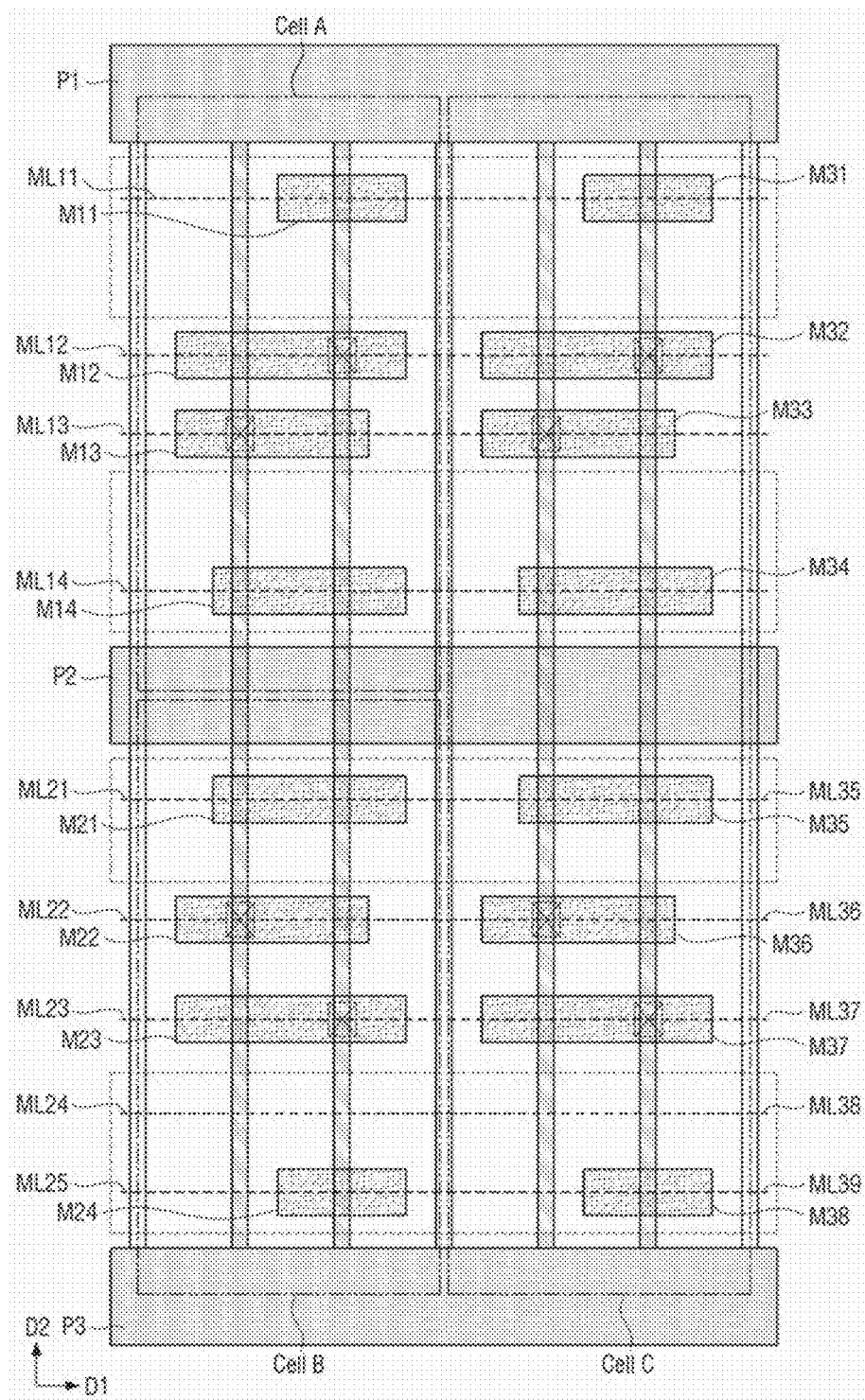

Referring to FIG. 16, the integrated circuit includes at least one single-height standard cell and at least one multi-height standard cell. In the illustrated example, the integrated circuit may include the standard cell Cell A and the standard cell Cell B which are single-height standard cells, and the standard cell Cell C which is a multi-height standard cell. The standard cell Cell A and the standard cell Cell B may be adjacent to each other in the second direction D2, and each may have one surface that borders the power wiring line P2. The standard cell Cell A and the standard cell Cell C may be adjacent to each other in the first direction D1, and each may have one surface that borders the insulating gate PCI.

In the illustrated example, only three standard cells are illustrated, but according to various embodiments, at least one standard cell Cell A may be consecutively disposed on the left side of the standard cell Cell A, at least one standard cell Cell B may be consecutively disposed on the left side of the standard cell Cell B, and at least one standard cell Cell C may be consecutively disposed on the right side of the standard cell Cell C.

According to some embodiments, the standard cell Cell A includes four metal tracks ML11, ML12, ML13, and ML14 according to a preset design. The standard cell Cell B includes five metal tracks ML21, ML22, ML23, ML24, and ML25 according to a preset design. The multi-height standard cell Cell C may include four metal tracks ML11, ML12, ML13, and ML14 with the same design as the standard cell Cell A in the upper region facing the side surface of the standard cell Cell A, and may include five metal tracks ML35, ML36, ML37, ML38, and ML39 with the same design as the standard cell Cell B in the lower region facing the side surface of the standard cell Cell B.

Figure 17:
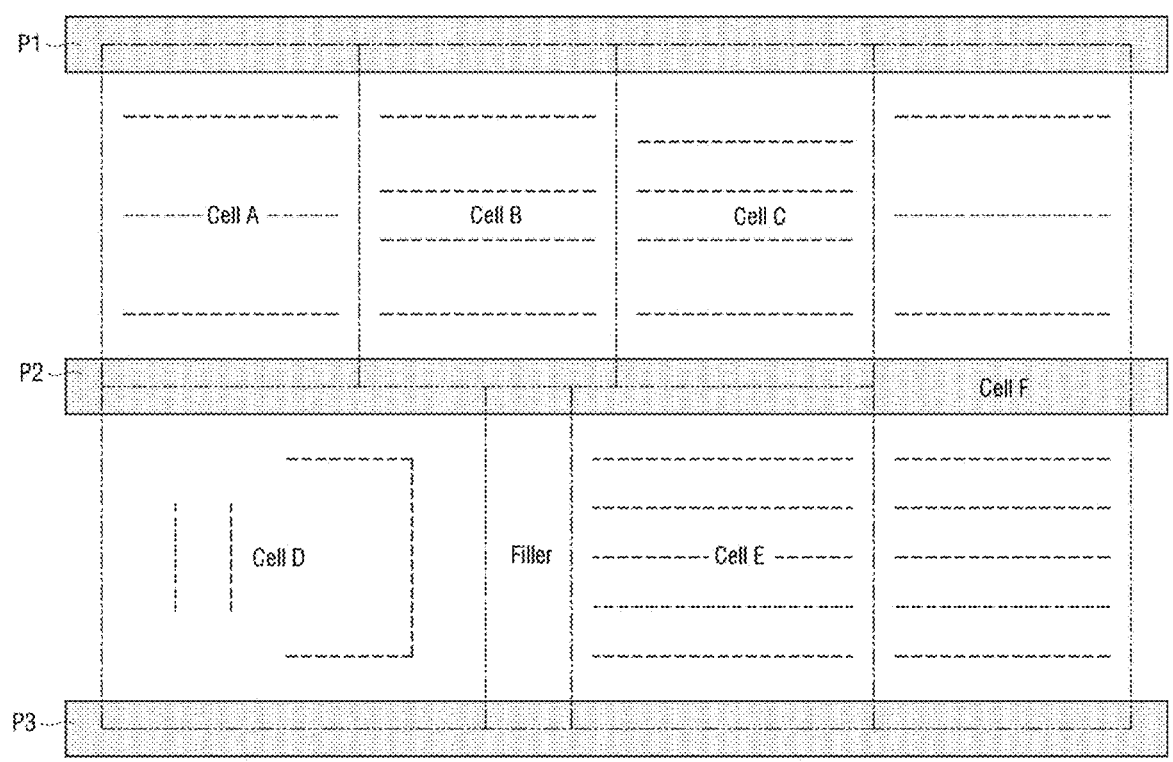

Referring to FIG. 17, an integrated circuit including a plurality of standard cells is exemplarily illustrated. Reference symbols Cell A, Cell B, Cell C, Cell D, Cell E, and Cell F are used to distinguish standard cells with corresponding designs different from each other, respectively. The illustrated Cell A, Cell B, Cell C, Cell D, Cell E, and Cell F may each be one standard cell or a standard cell group including a plurality of standard cells having the same design according to various embodiments.

According to some embodiments, the integrated circuit may include at least three power wiring lines P1, P2, and P3. The standard cells Cell A, Cell B, and Cell C may be adjacent in the first direction D1 and may be disposed between the power wiring lines P1 and P2. The standard cells Cell D and Cell E may be adjacent in the first direction D1 and may be disposed between the power wiring lines P2 and P3.

The length of the standard cells Cell A, Cell B, and Cell C and the standard cells Cell D and Cell E in the second direction D2, that is, the spacing between the center lines of the power wiring lines, may be the same. The length of the standard cell Cell F in the second direction D2 may be a multiple of the length of the standard cells Cell A, Cell B, Cell C or the standard cells Cell D and Cell E in the second direction D2. Although the number of the metal track designs varies depending on the design, since the spacing between the power wiring lines is constant, uniformity in layout design may be improved.

According to some embodiments, the standard cell Cell A may have a design including three metal tracks, the standard cell Cell B may have a design including four metal tracks, and the standard cell Cell C may have a design including four metal tracks.

According to some embodiments, all of the standard cell Cell B and the standard cell Cell C include four metal tracks, but may be standard cells with designs different from each other because at least one metal track thereof is not disposed on the same line extending in the first direction D1.

The standard cell Cell D may have a design including three metal tracks and may be a bi-directional metal track in which at least one metal track thereof extends in the first and second directions D1 and D2. For example, at least one metal track of the standard cell Cell D includes two linear segments that extend in the first direction D1 and one linear segment that extends in the second direction D2. The standard cell Cell E may have a design including five metal tracks. The standard cell Cell F may have a design including eight metal tracks, in which the upper region between the power wiring lines P1 and P2 may include three metal tracks, and the lower region between the power wiring lines P2 and P3 may include five metal tracks.

In the illustrated standard cells Cell A, Cell B, Cell C, Cell D, Cell E, and Cell F, the placement of the active region AR may be changed according to the placement of the metal tracks of the corresponding design.

According to example embodiments, a filler cell may be disposed between the standard cells Cell A and Cell B, between the standard cells Cell B and Cell C, between the standard cells Cell D and Cell E, between the standard cells Cell E and Cell F, or between the standard cells Cell C and Cell F. In the illustrated example, a case where the filler cell is disposed between the standard cells Cell D and Cell E is exemplarily illustrated.

The filler cell may be a designed block of an integrated circuit inserted between two standard cells adjacent to each other to follow the integrated circuit design and the integrated circuit manufacturing rule. The proper design and the alignment of the standard cell and the filler cell may enhance packing density and circuit performance. The filler cell may be disposed between adjacent standard cells when the wiring line in each standard cell becomes complicated. The wiring lines of the first metal wiring layer should be disposed so as not to overlap each other within one standard cell. For example, when an output signal of any one standard cell is to be inputted to a plurality of standard cells, the filler cell may be used.

Figure 18:
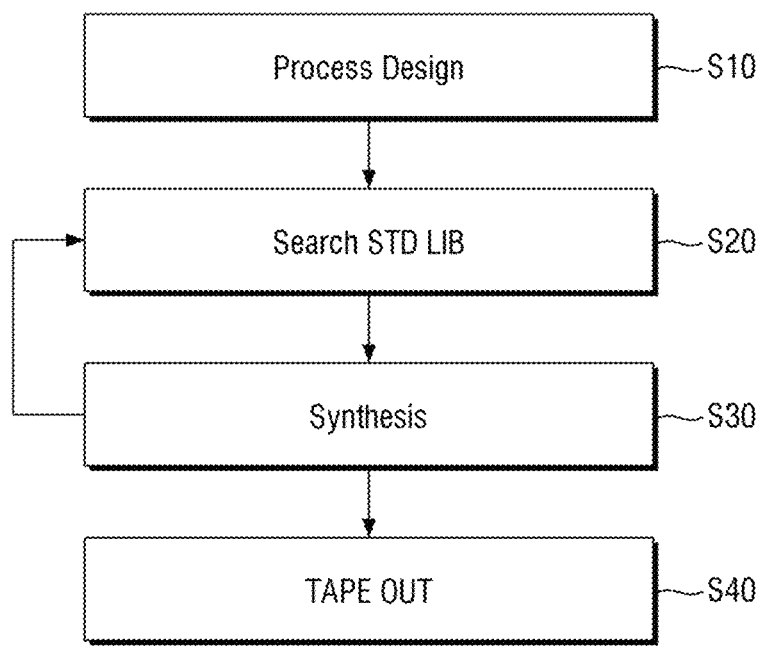
FIG. 18 is a flowchart illustrating an integrated circuit design using a standard cell, according to example embodiments.

FIG. 18 is a flowchart illustrating an integrated circuit design using a standard cell according to some embodiments.

Referring to FIG. 18, first, a process design is set for an integrated circuit required by a user (step S10). When the process design is confirmed, the previously stored standard cell library (STD LIB) is searched, and standard cells required for the confirmed process design are selected from the previously stored standard cell library (step S20). Next, a synthesis process is performed to combine the standard cells according to the process (step S30). The standard cell library may store layouts for a plurality of standard cells and information on standard cells. The information on the standard cell may include functions, characteristics, requirements, and the like of the corresponding standard cell.

In the case of combining the standard cells, the standard cells may be selectively chosen from the standard cell library in consideration of the placement according to the operation sequence, a routing relationship of input/output wirings for transmitting a signal, operation timing, and the like.

The finally selected standard cell may be taped out to the final layout of the integrated circuit by combining all of the operation timing, a signal wiring, and the like (step S40).

What is claimed is:

1. An integrated circuit including a plurality of standard cells, the integrated circuit comprising:
    a first standard cell group including at least two first standard cells;
    a second standard cell group adjacent to the first standard cell group in a first direction, the second standard cell group including at least one second standard cell; and
    a first insulating gate bordered by one side of at least one of the first standard cells and one side of the at least one second standard cell,
    wherein each of the at least two first standard cells and the at least one second standard cell includes a p-type transistor (pFET) and an n-type transistor (nFET) which are integrated,
    wherein each of the at least two first standard cells and the at least one second standard cell has first wiring lines of different designs, and
    wherein each of the at least two first standard cells and the at least one second standard cell has the same or different placement of an active region according to a corresponding design.

2. The integrated circuit of claim 1, wherein each of the at least two first standard cells and the at least one second standard cell includes:
    a first active region extending in a first direction and on which the p-type transistor is disposed;
    a second active region extending in the first direction and on which the n-type transistor is disposed;
    an active region separation layer configured to separate the first active region from the second active region;
    at least one gate stack extending in a second direction and intersecting the first active region, the second active region, and the active region separation layer; and
    at least two source/drain contacts extending in the second direction and intersecting at least one of the first active region or the second active region, the source/drain contacts being spaced apart from each other between the gate stacks or between the first insulating gate and the gate stack, wherein the first wiring lines are disposed at a first metal level connected to the gate stack or the source/drain contact through a via.

3. The integrated circuit of claim 1,
wherein the corresponding design includes a plurality of preset metal tracks, and
wherein each of the first wiring lines is disposed on any one of the metal tracks.

4. The integrated circuit of claim 3,
wherein one first standard cell of the at least two first standard cells includes at least two first metal tracks, and
the at least one second standard cell includes second metal tracks, and
wherein a number of the second metal tracks of the at least one second standard cell is different from a number of the first metal tracks of the one first standard cell.

5. The integrated circuit of claim 3,
wherein one first standard cell of the at least two first standard cells includes a first metal track extending in a first direction, and
wherein the at least one second standard cell includes at least one second metal track extending in the first direction and a second direction.

6. The integrated circuit of claim 3,
wherein one first standard cell of the at least two first standard cells includes at least two first metal tracks extending in a first direction,
wherein the at least one second standard cell includes second metal tracks extending in the first direction,
wherein a number of the second metal tracks of the at least one second standard cell is equal to a number of the first metal tracks of the one first standard cell, and
wherein at least one of the first metal tracks is not disposed on the same line as the second metal track.

7. The integrated circuit of claim 1, further comprising:
a third standard cell group adjacent to the first standard cell group in a second direction and including at least one third standard cell; and
a power wiring line extending in the first direction, the power wiring line being bordered by the other side of at least one of the first standard cells and one side of the at least one third standard cell,
wherein each of the first standard cell and the third standard cell has first wiring lines of different designs.

8. An integrated circuit comprising:
at least one first standard cell;
a second standard cell adjacent to a side surface of the at least one first standard cell in a first direction; and
a first wiring line disposed on the at least one first standard cell or the second standard cell,
wherein each of the at least one first standard cell and the second standard cell has the first wiring line disposed according to a different metal track design,
wherein each of the at least one first standard cell and the second standard cell includes:
at least one first active region extending in the first direction and on which a p-type transistor is disposed;
at least one second active region extending in the first direction and on which an n-type transistor is disposed;
an active region separation layer extending in the first direction and disposed between the first active region and the second active region;
an insulating gate and at least one gate stack extending in a second direction and intersecting the first active region, the second active region, and the active region separation layer; and
at least two source/drain contacts extending in the second direction and disposed between the gate stacks adjacent to each other in the first direction,
wherein the metal track design includes a plurality of metal tracks on which the first wiring line can be disposed on a standard cell basis, and
wherein the first wiring line is connected to the gate stack or the source/drain contact through a via.

9. The integrated circuit of claim 8,
wherein the metal tracks of the first standard cell include:
two first metal tracks extending in the first direction and disposed in parallel on the active region separation layer; and
at least one second metal track extending in the first direction and disposed on the first active region or the second active region, and
wherein the metal tracks of the second standard cell include:
two third metal tracks extending in the first direction and disposed in parallel on the active region separation layer; and
at least one fourth metal track extending in the first direction and disposed on the first active region or the second active region in parallel to the third metal track without being disposed on the same line as the second metal track.

10. The integrated circuit of claim 9, wherein the at least one first standard cell and the second standard cell include different numbers of metal tracks.

11. The integrated circuit of claim 8,
wherein all the metal tracks of the first standard cell extend in the first direction, and
wherein the second standard cell includes at least one metal track having at least one segment extending in the first direction and at least one segment extending in the second direction.

12. The integrated circuit of claim 8, further comprising:
a third standard cell adjacent to the at least one first standard cell in the second direction,
wherein one side of the third standard cell borders a power wiring line with the other side of the at least one first standard cell, and
wherein each of the at least one first standard cell and the third standard cell has a different first metal track design.

13. The integrated circuit of claim 8, wherein a length of the first standard cell in the second direction is equal to or at least twice a length of the second standard cell in the second direction.

14. An integrated circuit comprising:
a first standard cell group;
a second standard cell group bordering a first side of the first standard cell group;
a third standard cell group bordering a second side of the first standard cell group and a first side of the second standard cell group in a first direction; and
a first metal wiring layer disposed on the first standard cell group to the third standard cell group, wherein each of the first standard cell group to the third standard cell group includes an active region, a source/drain contact, a gate contact, and an insulating gate, wherein the first metal wiring layer includes at least one first wiring line connected to the source/drain contact or the gate contact through a via, at least one power wiring line, and an interlayer insulating layer filled between the first wiring line and the power wiring line, and wherein each of the first standard cell group, the second standard cell group, and the third standard cell group includes at least one first wiring line not disposed on the same extension line as the first wiring line in the first direction on adjacent standard cells bordering any one side.

15. The integrated circuit of claim 14, wherein the first metal wiring layer includes different metal track designs corresponding to the first standard cell group to the third standard cell group, respectively, wherein the metal track design includes a plurality of metal tracks, and wherein the at least one first wiring line is disposed on a corresponding metal track among the plurality of metal tracks.

16. The integrated circuit of claim 15, wherein a length of the active region in a second direction varies according to a number of the metal tracks included in the active region.

17. The integrated circuit of claim 15, wherein metal track designs of the first standard cell group and the second standard cell group include different numbers of metal tracks.

18. The integrated circuit of claim 15, wherein the metal track design of any one of the first standard cell group to the third standard cell group includes at least one bi-directional metal track extending in the first direction and a second direction.

19. The integrated circuit of claim 14, wherein the first standard cell group and the second standard cell group have the same length in a second direction.

20. The integrated circuit of claim 19, wherein a length of the third standard cell group in the second direction is a multiple of a length of the first standard cell group or the second standard cell group in the second direction.

* * * * *